(12) United States Patent
Phely

(10) Patent No.: US 6,547,345 B2
(45) Date of Patent: Apr. 15, 2003

(54) TRACK DRIVE DEVICE FOR ALL TERRAIN VEHICLE

(75) Inventor: Olivier Phely, Thenisy (FR)

(73) Assignee: Otico, Longueville (FR)

( * ) Notice: Subject to any disclaimer, the term of this patent is extended or adjusted under 35 U.S.C. 154(b) by 0 days.

(21) Appl. No.: 09/876,163

(22) Filed: Jun. 8, 2001

(65) Prior Publication Data
US 2002/0017403 A1 Feb. 14, 2002

(30) Foreign Application Priority Data
Jun. 9, 2000 (FR) .............................. 00 07440

(51) Int. Cl.⁷ .............................................. B62D 55/10
(52) U.S. Cl. ...................... 305/124; 305/131; 180/9.52
(58) Field of Search ................................. 305/124, 128, 305/129, 130, 131, 135; 180/9.1, 9.5, 9.52

(56) References Cited

U.S. PATENT DOCUMENTS

| 1,450,470 A | * | 4/1923 | Wickersham | |
| 4,364,443 A | * | 12/1982 | Sato et al. | 180/9.5 |
| 5,273,126 A | 12/1993 | Reed et al. | 180/9.21 |
| 5,622,234 A | * | 4/1997 | Nagorcka et al. | 180/9.5 |
| 6,164,399 A | * | 12/2000 | Bays | 180/9.5 |
| 6,247,547 B1 | * | 6/2001 | Lemke et al. | 180/9.5 |

FOREIGN PATENT DOCUMENTS

| DE | 497672 | 5/1930 |
| NL | 2916 | 1/1917 |
| WO | 99/54189 | 10/1999 |

* cited by examiner

*Primary Examiner*—Russell D. Stormer
(74) *Attorney, Agent, or Firm*—Dennison, Schultz & Dougherty

(57) ABSTRACT

A track drive device for all terrain vehicle comprises a frame (14) able to be mounted on the side of a chassis (C) of a vehicle and carrying two main wheels (38, 42) and support wheels (40A, B, 40E) around which is wound a track (12). The frame (14) comprises a rear part (16) able to be fixed to the chassis (C) of the vehicle and carrying one (38) of the main wheels, and a front part in the form of an approximately horizontal oscillating beam (18) carrying the other main wheel (42) and at least one (40D, 40E) of the support wheels and mounted pivoting about a first transverse pivot (20) located at a lower level. The device also comprises an approximately horizontal suspension arm (52) arranged above the oscillating beam (18), linked to the latter by a connecting rod (64) and mounted pivoting around a second transverse pivot (24) arranged at an upper level approximately at the height of the chassis.

13 Claims, 3 Drawing Sheets

TRACK DRIVE DEVICE FOR ALL TERRAIN VEHICLE

FIELD OF THE INVENTION

The invention relates to a track drive device for all terrain vehicles such as machines used in agriculture, viticulture and oyster culture, civil engineering or forestry.

BACKGROUND OF THE INVENTION

Devices of this type are already known which comprise a frame suitable for mounting on the side of the vehicle chassis and carrying two main wheels and support wheels around which the track is wound.

Two drive devices are then provided mounted on either side of the chassis either as original or as replacement equipment.

In vehicles of this type the track can be a conventional track consisting of articulated metal plates or a track consisting of a flexible endless belt for example of reinforced elastomer material.

In vehicles of this type each drive device is normally mounted oscillating around an axle of the chassis to allow each of the tracks to follow the configuration of the ground over which the vehicle moves. Also each device is linked to the chassis by suspension means which are generally located below and at the front of the chassis.

These known devices have in particular the drawback that the ground clearance of the all terrain vehicle is comparatively low which means that these devices are poorly adapted to certain specific applications, in particular for certain agricultural or viticultural tractors which must be able to "straddle" certain crops.

SUMMARY OF THE INVENTION

To solve this problem it is proposed to raise the chassis and drive each of the tracks by a drive wheel offset upwards in relation to the axle of the main wheels. However such a solution does not fully resolve the said problem.

In fact each track drive device must be mounted articulated while being linked to the chassis by suspension elements which are a source of obstruction.

Also the linking of the suspension means to the drive device poses problems as there is a large vertical offset between the frame of the device and the vehicle chassis.

Also these known solutions do not allow the device to be adapted to the desired track width of the vehicle.

The purpose of the invention in particular is to overcome the drawbacks above.

To this end it proposes a track drive device of the type defined above in which the frame comprises a rear part able to be fixed to the vehicle chassis and carrying one of the main wheels, and a front part made in the form of an approximately horizontal oscillating beam carrying the other main wheel and at least one of the support wheels and mounted pivoting around a first transverse pivot located at a lower level. An approximately horizontal suspension arm is also provided arranged above the oscillating beam and linked to the latter by a connecting rod and mounted pivoting about a second transverse pivot arranged at an upper level approximately at the height of the chassis.

Because the oscillating beam is linked to suspension arm via a connecting rod, and the suspension arm is located above the oscillating beam and hence offset upwards, it is possible to increase in particular the ground clearance of the vehicle chassis.

Also it is this suspension arm and not the oscillating beam which is linked to the suspension elements, which solves the problems of a long link between the oscillating beam and the vehicle chassis.

In a first embodiment of the invention the rear part of the frame carries a drive wheel wedged onto a drive shaft and around which is wound the track.

In a second embodiment of the invention the main wheel carried by the rear part of the frame is wedged onto a drive shaft to form a drive wheel for the track.

Thus in the latter case the rear part of the frame carries a single wheel acting both as main wheel and drive wheel.

Advantageously the rear part of the frame is fixed to the end of a transverse bar fixed horizontally below the chassis and forming the second pivot for the suspension arm. Thus the second pivot is approximately at chassis height.

It is advantageous that the rear part of the frame is also fixed to the end of a transverse beam extending horizontally below the chassis. The result is a rigid link between the frame of the device and the vehicle chassis.

In the said first embodiment, the rear part of the frame advantageously comprises an approximately horizontal beam carrying at least one support wheel and supporting the first pivot. Thus the oscillating beam is articulated on this support pivot, while being approximately in its extension.

According to another characteristic of the invention the connecting rod is articulated in the upper part on the suspension arm and in the lower part on an approximately vertical support fixed to the oscillating beam and having the selected height.

Thus by selecting the height of the support the device can be adapted as a function of the vehicle and the desired ground clearance.

According to another characteristic of the invention, the suspension arm has a front end linked to the chassis via a suspension element.

In a preferred embodiment the front end of the suspension arm comprises a plate in which is provided a window. The suspension element is a leaf suspension element fixed transversely below the chassis, one end of which is held in the said window.

Advantageously the oscillating beam comprises means for tensioning the track.

In another preferred embodiment of the invention, the track is a flexible endless belt advantageously formed of a reinforced elastomer material with drive studs on the inside.

The device in the invention can constitute an assembly ready for installation known as a kit and able to be mounted on the vehicle chassis as replacement for an articulated plate track or a drive wheel; the device can also constitute an assembly mounted originally on the chassis.

BRIEF DESCRIPTION OF THE DRAWINGS

In the description below produced purely as an example reference is made to the attached drawings on which.

DETAILED DESCRIPTION OF THE INVENTION

Figures 1, 2:
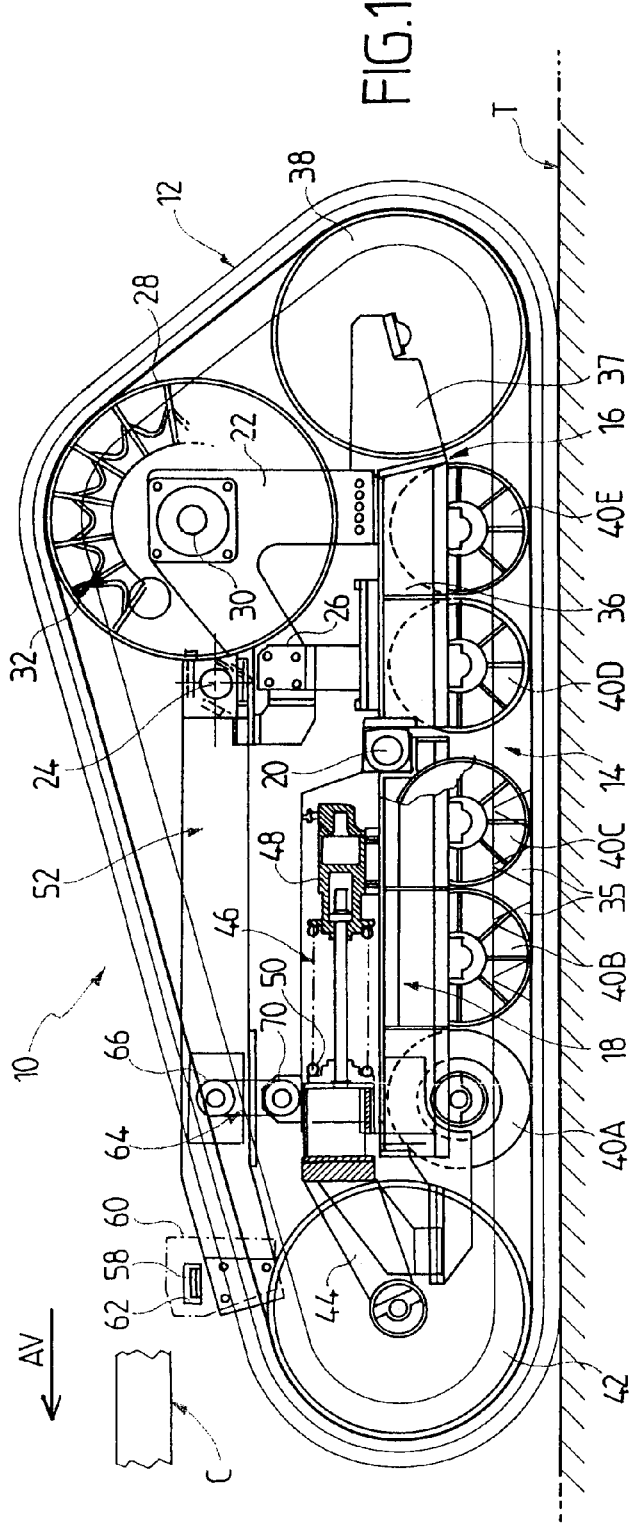
FIG. 1 is a side view of a track drive device according to a first embodiment of the invention.
FIG. 2 is a horizontal cross-section of the device in FIG. 1.

Reference is made first to FIGS. 1 and 2 which show a drive device 10 for a track 12 (in this example a flexible track) for an all terrain type vehicle such as for example an agricultural tractor. The device 10 is able to be mounted laterally on the chassis C (shown diagrammatically) of the vehicle. Thus it is understood that such a vehicle is fitted with two devices 10 mounted symmetrically one on each side.

Each device 10 may be designed to be mounted originally on the vehicle chassis or can constitute an assembly ready for installation known as a kit able to be installed in place of other equipment, for example a drive device for an articulated plate track, or as replacement for a conventional wheel.

The device 10 comprises a frame 14 with a rear part able to be fixed to the chassis C of the vehicle and a front part 18 mounted pivoting on the rear part 16 about a transverse pivot 20 located at a lower level i.e. as close as possible to the level of the ground T on which the vehicle moves.

The direction of advance (forward movement) of the vehicle is shown by arrow AV on FIG. 1.

The rear part 16 comprises a bent loop 22, one of the arms of which is fixed firstly to the end of a transverse bar 24 (in this example a bar of circular section) fixed horizontally below the chassis C and secondly to the end of a transverse beam 26 (in this example a beam of square section) extending horizontally below the chassis C. It is understood that the transverse bar 24 and the transverse beam 26 are fixed respectively to two drive devices provided on either side of the frame C.

The loop 22 is thus fixed firmly to the chassis C. It carries a drive wheel 28 which is wedged onto a drive shaft 30 and around which is wound the track 12. The wheel 26 comprises two spaced flanges connected together at regular intervals by drive cleats 32 (FIG. 1) arranged parallel to each other on the periphery of the wheel and intended to engage with the inside of the flexible endless belt 12.

This flexible belt is advantageously made of an elastomer material for example of natural rubber base, reinforced on the inside by reinforcements (not shown). The endless belt has on the outside a rolling surface fitted with lugs 34 (FIG. 2). The flexible endless belt is fitted on the inside with a row of studs 35 (FIG. 1) arranged in the longitudinal direction of the belt and spaced at constant intervals. These studs are approximately pyramidal in form as described in patent FR-A-2 711 959 (93 13211) by the applicant.

The cleats 32 of the drive wheel 28 are intended to engage in the clear spaces delimited between the studs 35 to drive the track.

The rear part 16 also comprises an approximately horizontal beam 36 fixed in the lower part of the arm 22 and extended by a fork 37 bearing a main wheel 38 (rear wheel) and two support wheels 40D and 40E.

The beam 36 in its front part supports the pivot 20 about which is articulated the oscillating beam 18.

This beam 18 is approximately horizontal and is situated approximately in the extension of the beam 36. It carries three other support wheels 40A, 40B and 40C and another main wheel 42 (front wheel). As can be seen on FIG. 1, the main wheels 38 and 42 are approximately of the same diameter which is greater than that of the support wheels 40A to 40E. The drive wheel 28 is located at a level higher than that of the axles of the main wheels 38 and 42 such that the track 12 viewed from the side has an approximately triangular form.

The main wheel 42 is carried by a fork 44 itself fixed to a link element carried by a tensioning and damping mechanism 46 supported by the oscillating beam 18. This mechanism comprises a jack 48 and a spring 50 and allows the fork 44 to be tensioned such that the front wheel 42 acts as a tensioning wheel for the track. Also the spring 50 acts as damper for the track when this rolls over obstacles. The general structure of the beam with its wheels and tensioning and damping mechanism is known in general from patent FR-A-2 768 387 (97 11398) in the name of the applicant.

The device 10 also comprises a suspension arm 52 arranged approximately horizontally above (at a higher level than) the oscillating beam 18.

Figure 3:
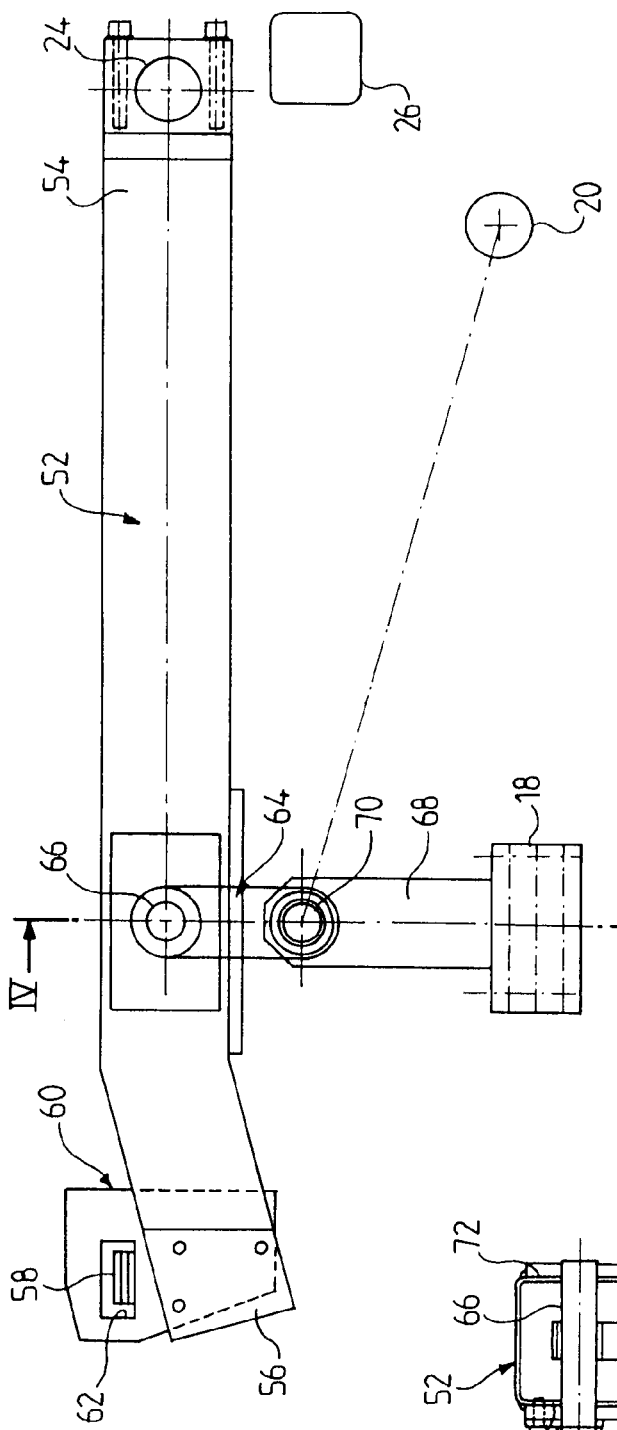
FIG. 3 is a side view of the suspension arm.
Figure 4:
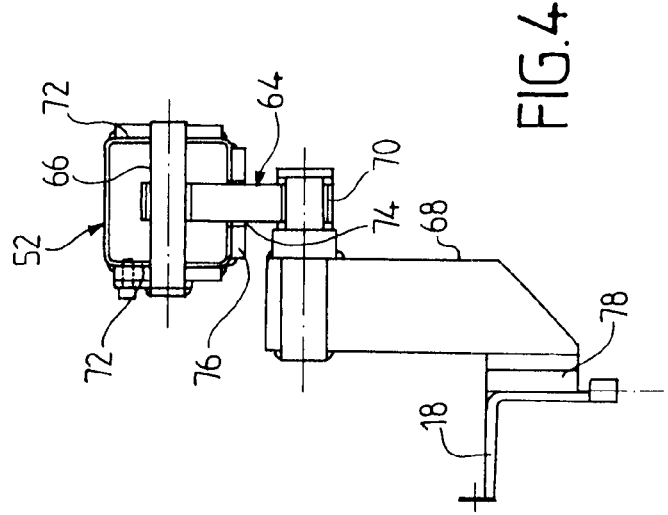
FIG. 4 is a cross-section view along line IV—IV of FIG. 3.

This suspension arm takes the form of an elongated hollow element of approximately square section (FIGS. 2, 3 and 4). It has a rear end 54 delimiting a cage in which is held one end of the transverse bar 24 which thus forms a pivot for the suspension arm.

The suspension arm 52 comprises a front end 56 which is linked to the chassis C via a suspension element 58. As can be seen more particularly on FIG. 3, the front end 56 of the oscillating beam is firmly attached to a plate 60 in which is arranged a window 62 of general rectangular shape. The plate 60 is guided vertically by means (not shown) so that it can move freely in height when the suspension arm oscillates around its axle.

The suspension element 58 is a leaf suspension mounted transversely below the chassis C and one end of which is held in the window 62. Thus the two ends of the leaf suspension element co-operate respectively with the two windows 62 belonging to the two drive devices 10 provided on the two sides of the chassis C. The window 62 has dimensions approximately greater than those of the transverse section of the leaves at the point where they pass through the window, in order to provide play.

The suspension arm 52 is linked to the oscillating beam 18 via a connecting rod 64. The latter is arranged approximately vertically. It is articulated at its upper part to the suspension arm 52 via a pivot 66 and in the lower part to a support 68 via a pivot 70. The pivots 66 and 70 are two axles parallel to each other and to the pivots 20 and 24. They are approximately horizontal and extend transversely in relation to the longitudinal direction of the chassis C of the vehicle.

The pivot 66 extends between two opposite vertical faces 72 of arm 52 (FIG. 4) and the connecting rod 64 passes through a guide slot 74 arranged in a lower face 76 of the arm 52 (FIG. 4). The pivot 70 protrudes laterally in relation to support 68 (FIG. 4) which extends approximately vertically, and is attached to the oscillating beam 18. This support 68 can be produced with a height selected to allow the device to adapt to the vehicle concerned and as a function of the ground clearance (clear height below the chassis C) of the vehicle.

As can also be seen on FIG. 4, the support 68 is fixed at its lower end on the oscillating beam 18 via a shim 78, the thickness of which can vary allowing greater or lesser offset of the suspension arm in relation to the chassis C and thus modify the spacing (width) between the two tracks. As can be seen on FIG. 2, the track 12 extends outward in relation to suspension arm 52 which is itself attached to the chassis.

Thus by modifying the thickness of the shim 78 the track can be positioned at a greater or lesser distance from the chassis and consequently the width between the two tracks can be modified.

It is evident that the connecting rod 64 can compensate for the difference between a first radius (defined between the pivots 24 and 66) and a second radius (defined between the pivots 20 and 70) as can be seen on FIG. 3. Also the connecting rod contributes to lateral support of the oscillating beam 18.

Figure 5:
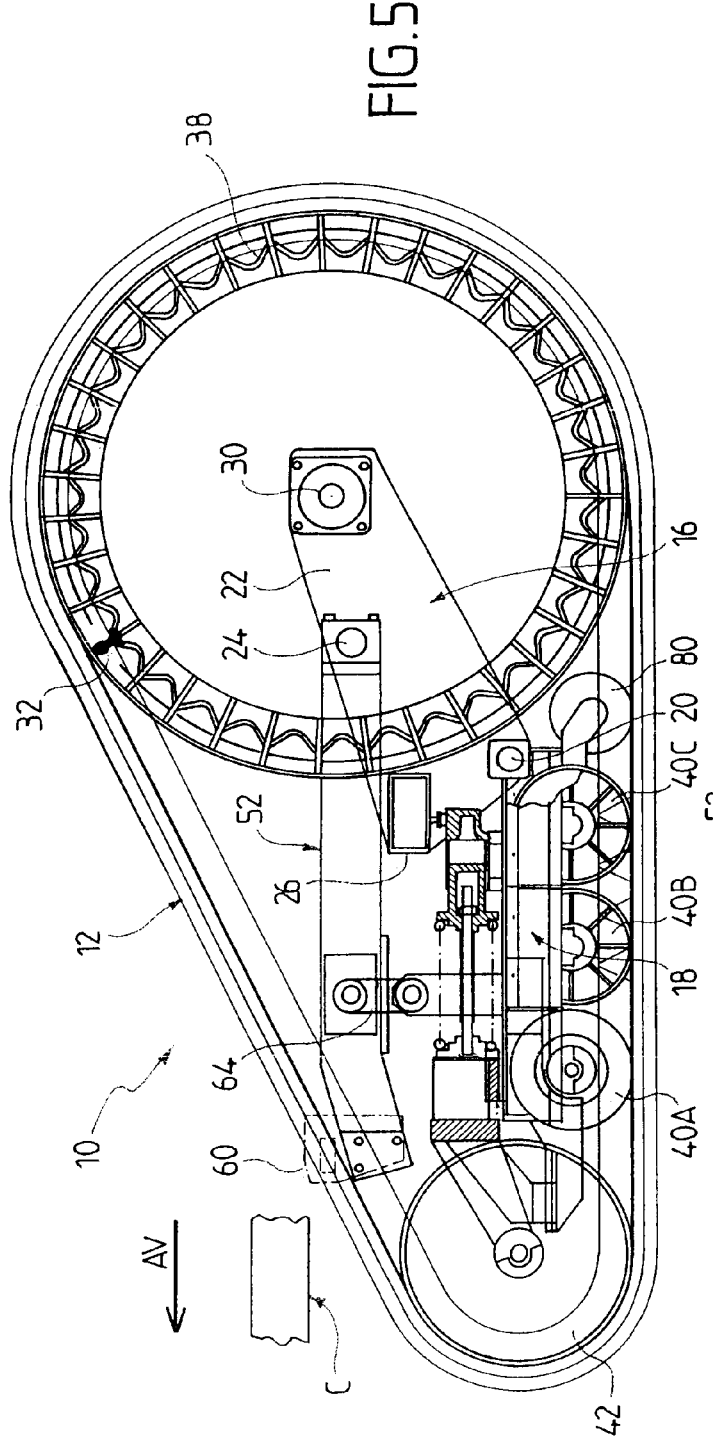
FIG. 5 is a side view of a track drive device according to a second embodiment of the invention.
Figure 6:
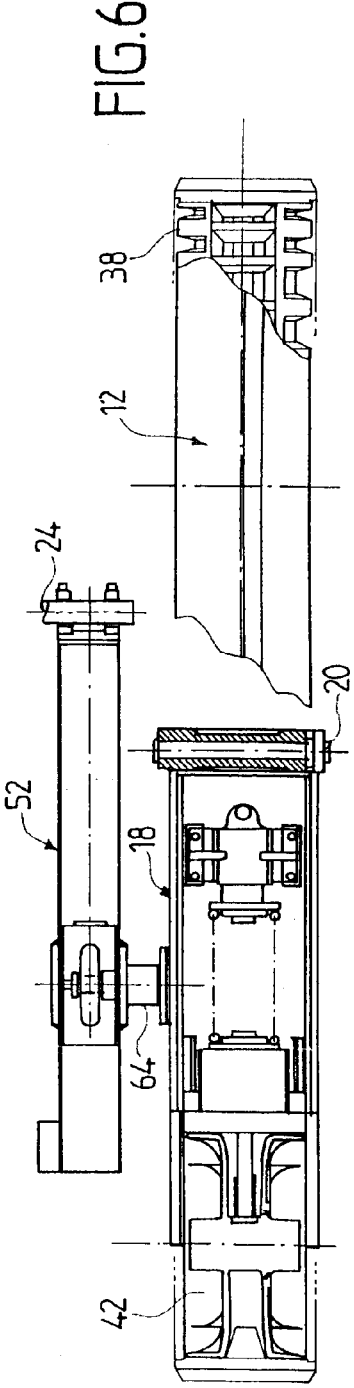
FIG. 6 is a horizontal cross-section through the device in FIG. 5.

Reference is now made to FIGS. 5 and 6 to describe a device according to another embodiment of the invention. The elements in common with those of the previous embodiment are designated by the same numerical references.

In the device in FIGS. 5 and 6 the main rear wheel 38 carried by the rear part 16 of the frame is wedged onto the drive shaft 30 and thus fulfills the function of both main wheel and drive wheel. The rear main wheel 38 is fitted to this end with cleats 32 similar to those of the drive wheel 28 described above. The main rear wheel 38 here has a diameter greater than that of the main front wheel 42.

The rear part 16 of the frame has a different configuration from that of the former embodiment. Here it is reduced to a loop 22 in the form of an arm which is fixed to both the transverse bar 24 and the transverse beam 26. One of the ends of this loop is crossed by the drive shaft 30 of the wheel 38 whereas its other end carries the pivot 20 which serves to articulate the front part 18 in the form of an oscillating beam. Also the rear part 16 does not carry any support wheels.

In this case the front part 18 is approximately identical to that of the former embodiment. It carries three support wheels 40A, 40B and 40C and an intermediate wheel 80 of smaller diameter than the support wheels which is arranged between support 40C and the main rear wheel 38. For the rest, the structure and function of the device of FIGS. 5 and 6 are similar to those of the device in FIGS. 1 and 4.

The device of the invention can constitute an assembly ready for installation or kit to replace original equipment, for example a track system with articulated metal plates. It can also be equipment mounted originally on the vehicle chassis.

Naturally the invention is not limited to the embodiments described above as examples, and extends to other variants.

Thus it is possible to apply the doctrine of the invention to a track consisting of articulated metal plates.

What is claimed is:

1. Track drive device for all terrain vehicle comprising a frame able to be mounted on the side of a vehicle chassis and carrying two main wheels and support wheels around which is wound the track, characterised in that the frame (14) comprises a rear part (16) able to be fixed to the chassis (C) of the vehicle and carrying one (38) of the main wheels, and a front part produced in the form of an approximately horizontal oscillating beam (18) bearing the other main wheel (42) and at least one (40D, 40E) of the support wheels and mounted pivoting on the rear part (16) about a first transverse pivot (20) located at a lower lever, and in that an approximately horizontal suspension arm (52) is also provided arranged above the oscillating beam (18) and linked to the latter by a connecting rod (64) and mounted pivoting about a second transverse pivot (24) arranged at an upper level approximately at the height of the chassis, and wherein the connecting rod (64) is articulated in the upper part to the suspension arm (52) and in the lower part to an approximately vertical support (68) fixed to the oscillating beam (18) and presenting a selected height.

2. Device according to claim 1, characterised in that the rear part (16) of the frame (14) carries a drive wheel (28) wedged on a drive shaft (30) and around which is wound the track (12).

3. Device according to claim 1, characterised in that the main wheel (38) carried by the rear part (16) of the frame (14) is wedged onto a drive shaft (30) so as to form a drive wheel for the track (12).

4. Device according to claim 3, characterised in that the rear part (16) of the frame (14) is fixed to the end of a transverse bar (24) fixed horizontally below the chassis (C) and forming the second pivot for the suspension arm (52).

5. Device according to claim 4, characterised in that the rear part (16) of the frame (14) is also fixed to the end of a transverse beam (26) extending horizontally below the chassis (C).

6. Device according to claim 1, characterised in that the rear part (16) of the frame (14) comprises an approximately horizontal beam (36) carrying at least one support wheel (40D, 40E) and supporting the first pivot (20).

7. Device according to claim 1, characterised in that the suspension arm (52) has a front end (56) linked to the chassis (C) via a suspension element (58).

8. Device according to claim 7, characterised in that the front end (56) of the suspension arm (52) comprises a plate (60) in which is arranged a window (62) and in that the suspension element (62) is a leaf suspension fixed transversely below the chassis (C) and one end of which is held in the said window (62).

9. Device according to claim 1, characterised in that the oscillating beam (18) comprises means (44, 46) for tensioning the track (12).

10. Device according to claim 1, characterised in that the track (12) is a flexible endless belt advantageously made of a reinforced elastomer material and having on the inside drive studs (35).

11. Device according to claim 1, further comprising an assembly ready for installation or kit able to be mounted on the chassis (C) of the vehicle to replace an articulated plate track or drive wheel.

12. Device according to claim 1, further comprising an assembly mounted originally on the chassis (C) of the vehicle.

13. Track drive device for all terrain vehicle comprising a frame able to be mounted on the side of a vehicle chassis and carrying two main wheels and support wheels around which is wound the track, characterised in that the frame (14) comprises a rear part (16) able to be fixed to the chassis (C) of the vehicle and carrying one (38) of the main wheels, and a front part produced in the form of an approximately horizontal oscillating beam (18) bearing the other main wheel (42) and at least one (40D, 40E) of the support wheels and mounted pivoting on the rear part (16) about a first transverse pivot (20) located at a lower lever, and in that an approximately horizontal suspension arm (52) is also provided arranged above the oscillating beam (18) and linked to the latter by a connecting rod (64) and mounted pivoting about a second transverse pivot (24) arranged at an upper level approximately at the height of the chassis, wherein the suspension arm (52) has a front end linked to the chassis (C) via a suspension element (58), and wherein the front end (56) of the suspension arm (52) comprises a plate (60) in which is arranged a window (62) and in that the suspension element (62) is a leaf suspension fixed transversely below chassis (C) and one end of which is held in the said window (62).

* * * * *